Patented July 26, 1927.

1,636,857

UNITED STATES PATENT OFFICE.

AUGUSTUS E. CRAVER, OF CLEVELAND, OHIO, ASSIGNOR TO THE BARRETT COMPANY, A CORPORATION OF NEW JERSEY.

PRODUCTION OF MALEIC ACID.

No Drawing.   Application filed May 23, 1923. Serial No. 641,011.

This invention relates to improvements in the composition of catalysts, particularly to catalysts which are capable of causing oxidation reactions and to processes wherein such catalysts are employed. It relates more specifically to improvements in the selective oxidation of aromatic hydrocarbons and has particular reference to the production of maleic anhydride by the vapor phase oxidation of benzene in the presence of a catalyst.

This invention may be regarded as an improvement upon the process described in United States Patent No. 1,318,633, and is based upon the discovery that the yields of maleic anhydride may be materially increased by the use of a mixed or composite catalyst of a particular character, namely, a catalyst containing vanadium oxide in admixture or combination with one or more other metal oxides which contribute to or promote the desired reaction.

I have done considerable work on the vapor phase oxidation of aromatic hydrocarbons, particularly benzene, in the presence of mixed catalysts, that is, catalysts consisting of a mixture of the oxides of various metals in intimate contact or combination with each other, and I have found that the component oxides of these catalysts exert an unexpected influence on each other in the production of maleic acid in the catalytic oxidation of benzene. I have found that many catalysts composed of various binary and ternary mixtures of the oxides of different metals, particularly metals of the fifth and sixth groups of the periodic system, and especially if such catalysts contain vanadium oxide as one of the components or constitutents, produce superior yields of maleic acid under appropriate catalytic conditions of operation. As particular instances of the catalysts to be employed, admixtures or combinations of the oxides of vanadium and molybdenum, molybdenum and uranium, and vanadium molybdenum and uranium, may be cited. For example, in the same apparatus and under substantially similar conditions of operation, except catalyst temperature, I have obtained from benzene yields of maleic acid from 5 to 25 percent, or better, in excess of those obtained by the use of vanadium, or molybdenum, or tungsten, or uranium oxide alone as the catalyst. The catalyst temperature is varied to some extent in order to obtain the maximum efficiency of production from each catalyst. It has been found that mixed catalysts function more effectively as far as maleic acid production from benzene is concerned when the catalyst temperature is somewhat higher than that employed with vanadium oxide alone as catalyst, although the range in temperature is approximately the same.

In the preparation of the mixed catalysts of the present invention, it is preferable that the component metallic oxides be in the most minutely divided condition and in intimate contact with each other, and preferably supported upon a carrier, in order to secure the maximum advantage of their use.

The preparation of the catalyst can be accomplished by starting with a solution containing a salt of the metals, the oxides of which metals are desired in the finished catalyst, and which metallic salts leave on ignition only the oxides of the metals, or it is also possible to use an aqueous suspension of the oxides or hydroxides of the metals. However, I have achieved the best results by employing a solution of the complex organic acid compounds of the metals, as described in my co-pending application, Serial No. 513,111, filed November 5, 1921. A specific example of the process therein set forth is as follows: A salt of the metal such as ammonium metavanadate or vanadium pentoxide, or similar metallic compound is mixed with an organic acid such as oxalic acid and heated until the reaction therebetween is completed. A "metallic-organo complex" such as ammonium divanadyl oxalate is thus produced. This is dissolved in a suitable solvent such as concentrated ammonium hydroxide. The carrier, upon which the catalyst is deposited or with which it is mixed, and which may consist of crushed pumice or other suitable powdered, granulated or fibrous material, may then be added to the prepared solution or suspension of the metallic-organo complex, and the whole evaporated to dryness while being stirred, after which it is ignited in air or other gases, or in the benzene oxygen-containing gas mixture to be employed in the catalysis. Many metals, such as aluminum, copper, nickel, silver, gold, etc., particularly if they are in a more or less porous condition, or if they have roughened or porous surfaces, are very suitable carriers. So-called "grained aluminum" of commerce will serve as one illustration of such a carrier. In the examples given below in illustration of the present invention, the catalyst is prepared in each case according to the method described in my copending application mentioned above.

It is to be noted that in the production of maleic acid by the oxidation of benzene, a definite amount of carbon dioxide (or carbon monoxide) and water, products of complete combustion, is at the same time produced. An excess of complete combustion over and above this amount not only represents a loss of benzene but it considerably increases the exotherm of the reaction and thus makes it more difficult to control and maintain the appropriate working conditions of the process.

It is also to be noted that only a part or portion of the benzene entering into contact with the catalyst may undergo oxidation, the remainder passing through unchanged and may be recovered in any suitable manner. Further, of the part or portion of benzene actually oxidized, only a part may be oxidized to maleic acid, the rest being oxidized mostly, if not entirely, to products of complete combustion. It is obvious, therefore, that the yields of maleic acid may be estimated either on the total benzene entering into contact with the catalyst or on that portion of benzene which actually undergoes oxidation. The yields of maleic acid given in this application are based on either of these two methods of estimation as the results are approximately the same in this case regardless of which of the two methods of estimation are used.

My invention will be further explained in connection with the following examples which are given for illustration purposes. It is intended not to limit the procedure to the exact details given, as the process can be carried out over wide limits both in choice of condition and also in the composition of the mixed catalyst without departing from the spirit and scope of the invention. The parts are by weight.

*Example.*—A mixture of approximately 13.0 parts of air to 1.0 part of benzene is passed over or through a catalyst coated on so-called grained aluminum particles of about ⅛ inch diameter said catalyst being composed of approximately 70 percent vanadium oxide and 30 percent molybdenum oxide, held at a temperature of about 505° C., which temperature is measured in the catalyst mass, and a time of contact of about 0.29 second is maintained between the reacting mixture and the catalyst. It is preferable to introduce the catalyst, or the carrier containing the same, into tubes, containers or other confined space, through which the reacting gases are passed. The exit gases containing the products of the reaction may be condensed, or they may be passed through water which dissolves the maleic acid, and the maleic acid may be recovered in any suitable manner. The yields of maleic acid are considerably in excess, from 10 to 30 percent or better, of yields which have been obtained from a catalyst consisting alone of the oxide or oxides of only one metal, for example, vanadium oxide.

If, in this example, a catalyst composed of 60 percent vanadium oxide and 40 percent molybdenum oxide is used in place of the catalyst composed of 70 percent vanadium oxide and 30 percent molybdenum oxide, the increased yield of maleic acid is approximately 5 to 20 percent over that obtained when vanadium oxide alone is used.

*Example 2.*—A mixture of approximately 12.0 parts of air to 1.0 part of benzene is passed through a catalyst coated on so-called grained aluminum particles of about ⅛ inch diameter said catalyst being composed of a mixture of approximately 50 percent vanadium oxide, 40 percent molybdenum oxide and 10 percent uranium oxide, held at a catalyst temperature of about 475° C., and a time of contact of about 0.32 second is maintained between the reacting gaseous mixture and the catalyst. The yield of maleic acid is about 5–10 percent greater than that obtained by the use of vanadium oxide alone as the catalyst. Other mixtures composed of vanadium, molybdenum and uranium oxides also produce analogous results.

It is to be understood that the various factors or conditions of the reaction, as stated above, are capable of wide variation. Among these conditions may be mentioned the temperature and pressure at which the reaction is carried out, as for example, the reaction may be carried out over a range of temperature substantially the same as that used for vanadium oxide alone, but the preferred temperatures are between 450° and 550° C., and the reaction may be carried out at atmospheric pressure or at increased or diminished pressure. The time of contact of the air-benzene mixture with the catalyst, the proportion of catalyst to the reaction gases, the relative proportions of benzene to oxygen-containing gas, which may consist of air, oxygen or ozone or a mixture of any or all of these or other gases which contain free oxygen, may also be varied. These conditions are all more or less inter-dependent on each other. Furthermore, much variation exists in the choice of the mixed catalyst, which in turn will necessitate variation or adjustment of the other conditions enumerated above in order to utilize to the greatest advantage the improvement in the composition of the catalyst for the production of maleic acid.

Materials containing benzene, together with the substances commonly associated with it, can be used instead of pure benzene for the production of maleic acid by the process of this invention and superior yields of maleic acid may be obtained.

It is to be understood that the term "maleic acid" and "maleic anhydride" are to be considered as synonyms, and the term "benzene" includes not only pure benzene but also the various grades of benzene obtained in the fractionation of coal tar light oils.

I claim:

1. In the process of making maleic acid, the improvement which comprises passing benzene in the vapor phase and an oxygen containing gas into contact with a catalyst, said catalyst containing a mixture of at least two oxides of the metals included in the fifth and sixth groups of the periodic system.

2. In the process of making maleic acid, the improvement which comprises passing benzene in the vapor phase and an oxygen-containing gas into contact with a catalyst including vanadium oxide and oxides of not more than two different metals of the sixth group of the periodic system.

3. The process of making maleic acid, which comprises passing benzene in the vapor phase and an oxygen-containing gas into contact with a catalyst including vanadium oxide and an oxide of a metal of the sixth group of the periodic system.

4. The process of making maleic acid, which comprises passing benzene in the vapor phase and an oxygen-containing gas into contact with a catalyst including vanadium oxide, molybdenum oxide and uranium oxide.

5. The process of making maleic acid, which comprises passing benzene in the vapor phase and an oxygen-containing gas into contact with a catalyst including vanadium oxide and molybdenum oxide.

6. The process of making maleic acid, which comprises passing benzene in the vapor phase and air into contact with a catalyst including vanadium oxide and molybdenum oxide, said catalyst being maintained at a temperature of about 450° to 550° C.

7. The process of making maleic acid, which comprises passing benzene in the vapor phase and an oxygen-containing gas into contact with a catalyst including the oxides of vanadium and molybdenum in the approximate proportions by weight of 7 to 3.

8. The process of making maleic acid, which comprises passing benzene in the vapor phase and air into contact with a catalyst including the oxides of vanadium and molybdenum in the approximate proportions by weight of 7 to 3, said catalyst being maintained at a temperature of about 450° to 550° C.

9. The process of making maleic acid, which comprises subjecting a mixture of benzene in the vapor phase and ten to twenty-five times its weight of air to the action of a catalyst including vanadium oxide and molybdenum oxide in the approximate proportions by weight of 7 to 3, said catalyst being maintained at a temperature of about 450° to 550° C.

In testimony whereof I affix my signature.

AUGUSTUS E. CRAVER.